United States Patent
Lei et al.

(10) Patent No.: US 8,812,536 B2
(45) Date of Patent: Aug. 19, 2014

(54) PROVIDING REGIONAL CONTENT BY MATCHING GEOGRAPHICAL PROPERTIES

(75) Inventors: Guo Ping Lei, Hangzhou (CN); Xiao Shuan Li, Hangzhou (CN); Na Ma, Hangzhou (CN); Wei Jia Liu, Hangzhou (CN); Chuan Wen Chen, Hangzhou (CN); Ming You Wang, Hangzhou (CN); Hong Xi Zhou, Hangzhou (CN); Xuan Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 133 days.

(21) Appl. No.: 12/664,863

(22) PCT Filed: Aug. 13, 2009

(86) PCT No.: PCT/US2009/053753
§ 371 (c)(1),
(2), (4) Date: Dec. 15, 2009

(87) PCT Pub. No.: WO2010/019801
PCT Pub. Date: Feb. 18, 2010

(65) Prior Publication Data
US 2010/0185663 A1 Jul. 22, 2010

(30) Foreign Application Priority Data
Aug. 13, 2008 (CN) .......................... 2008 1 0135169

(51) Int. Cl.
*G06F 17/30* (2006.01)
(52) U.S. Cl.
USPC ............................ 707/769; 707/736; 707/723
(58) Field of Classification Search
USPC ........... 707/736, 769, E17.014, E17.018, 723
See application file for complete search history.

(56) References Cited

U.S. PATENT DOCUMENTS

| 7,917,154 | B2 * | 3/2011 | Fortescue et al. .......... 455/456.1 |
| 2002/0049742 | A1 | 4/2002 | Chan et al. |
| 2002/0078035 | A1 | 6/2002 | Frank et al. |
| 2002/0156779 | A1 | 10/2002 | Elliott et al. |

(Continued)

FOREIGN PATENT DOCUMENTS

| JP | 07160701 | 6/1995 |
| JP | 2002108876 | 4/2002 |
| WO | WO03079229 | 9/2003 |
| WO | WO2007046445 | 4/2007 |

OTHER PUBLICATIONS

The Extended European Search Report mailed Nov. 9, 2011 for European patent application No. 09807309.1, 5 pages.

(Continued)

*Primary Examiner* — Shiow-Jy Fan
(74) *Attorney, Agent, or Firm* — Van Pelt, Yi & James LLP

(57) ABSTRACT

A method and a system provide regional content to users by associating data files with geographical properties and matching the geographical property of a data file with the geographical property of the user. The system extracts geographical information from a data file, and associates the data file with a source geographical property corresponding to the extracted geographical information according to a geographical information database. Upon obtaining a user geographical property of a user, the system provides the data file to the user if the source geographical property matches the user geographical property. The method and the system may be implemented using a geographical name lexicon or a geographical name suffix lexicon.

16 Claims, 4 Drawing Sheets

(56) References Cited

U.S. PATENT DOCUMENTS

| | | |
|---|---|---|
| 2003/0061211 A1 | 3/2003 | Shultz et al. |
| 2005/0091193 A1* | 4/2005 | Frank et al. ............ 707/1 |
| 2005/0108213 A1* | 5/2005 | Riise et al. ............ 707/3 |
| 2005/0227739 A1 | 10/2005 | Dowling et al. |
| 2005/0262062 A1* | 11/2005 | Xia ........................ 707/3 |
| 2006/0106778 A1* | 5/2006 | Baldwin ................. 707/3 |
| 2006/0200490 A1 | 9/2006 | Abbiss |
| 2006/0206624 A1* | 9/2006 | Wang et al. ............ 709/245 |
| 2007/0061363 A1 | 3/2007 | Ramer et al. |
| 2007/0260741 A1* | 11/2007 | Bezancon ............... 709/230 |
| 2007/0288437 A1 | 12/2007 | Xia |
| 2008/0010273 A1 | 1/2008 | Frank |
| 2008/0097966 A1 | 4/2008 | Choi et al. |
| 2008/0222119 A1 | 9/2008 | Dai et al. |
| 2008/0243821 A1 | 10/2008 | Delli Santi et al. |
| 2008/0256044 A1 | 10/2008 | Anderson et al. |
| 2008/0281800 A1 | 11/2008 | Bengtsson |
| 2009/0037396 A1 | 2/2009 | Uematsu et al. |
| 2009/0094212 A1 | 4/2009 | Zaccagnino |
| 2009/0182729 A1 | 7/2009 | Lu et al. |
| 2009/0209270 A1 | 8/2009 | Gutierrez et al. |
| 2009/0210416 A1 | 8/2009 | Bennett |

OTHER PUBLICATIONS

The Chinese Office Action mailed Dec. 31, 2011 for Chinese patent application No. 200810135169.2, a counterpart foreign application of U.S. Appl. No. 12/664,863, 17 pages.

The Japanese Office Action mailed Sep. 3, 2013 for Japanese patent application No. 2011-523177, a counterpart foreign application of U.S. Appl. No. 12/664,863, 8 pages.

* cited by examiner

US 8,812,536 B2

PROVIDING REGIONAL CONTENT BY MATCHING GEOGRAPHICAL PROPERTIES

RELATED APPLICATIONS

This application is a national stage application of international patent application PCT/US09/53753 filed Aug. 13, 2009, entitled "PROVIDING REGIONAL CONTENT BY MATCHING GEOGRAPHICAL PROPERTIES", which claims priority from Chinese patent application, Application No. 200810135169.2, filed Aug. 13, 2008, entitled "METHOD AND SYSTEM OF PROVIDING REGIONAL CONTENT", which applications are hereby incorporated in their entirety by reference.

TECHNICAL FIELD

The present disclosure relates to the field of Internet technologies, and particularly relates to methods and systems of providing regional content.

BACKGROUND

Internet has been used to provide information such as news, sports and entertainment. In addition to regular web pages, enormous amount of information may also be provided through bulletin board systems (BBS), blogs, albums, and videos. Such Internet information is currently provided by websites autonomously. Even though much Internet information is provided based on keyword search or category search (e.g., certain portal sites may use a search engine to provide relevant Internet information based on a keyword), such keyword-based information is just information that contains the keyword. For example, use a search engine to search for news using "Beijing" as a keyword, all news including the keyword "Beijing" art returned. However, the news found by this type of search may not always be events that have locally happened in Beijing, and hence do not satisfy a user's true intention of the search for local news.

Along with the development of Internet technologies and increasing demands of Internet users, technology that provides regional content is needed.

SUMMARY

Disclosed are a method and a system for providing regional content to users by associating data files with geographical properties and matching the geographical property of a data file with the geographical property of the user. The method extracts geographical information from a data file, and associates the data file with a source geographical property corresponding to the extracted geographical information according to a geographical information database. Upon obtaining a user geographical property of a user, the method provides the data file to the user if the source geographical property matches the user geographical property. The geographical information is information associated with geographical locations, and may be keyword-based or suffix-based. The geographical properties are identifiers of geographical locations. Multiple pieces of geographical information may be extracted from a data file to obtain multiple geographical properties, at least some of which may be associated with the data file.

In one embodiment, to extract the geographical information from the data file, the method provides a geographical name lexicon containing a plurality of geographical word entries. The method then finds a keyword in the data file matching one of the plurality of geographical word entries, and takes the matching keyword as at least a part of the geographical information extracted from the data file. The geographical keyword entries may include geographical names and/or phrases indicative of geographical names.

In another embodiment, to extract the geographical information from the data file, the method provides a geographical name suffix lexicon containing a plurality of geographical name suffixes. The method then finds a phrase in the data file frequently preceding a keyword matching one of the plurality of geographical name suffixes, and takes the phrase as at least a part of the geographical information extracted from the data file.

A variety of ways may be used to obtain the user geographical property, including inquiring the user's IP address, inquiring the user's registered address, inquiring a geographical location set by the user, obtaining coordinate information of the user, and collecting a focus point of the user's online browsing.

Multiple data files may be provided to the user. The user may be allowed to select from multiple data files whose source geographical property matches the user geographical property. The match between the source geographical property and the user geographical property may occur at one of various geographical levels, which can be defined by a physical relationship including any one of territorial relationship, jurisdiction relationship, administrative relationship, municipal relationship, and political relationship.

One aspect of the disclosure is a system of providing regional content. The system is computer-based and has a computer which includes a computer processor and a storage. The computer processor is programmed for performing the acts as described herein, such as extracting geographical information from a data file; associating the data file with a source geographical property corresponding to the extracted geographical information according to a geographical information database; obtaining a user geographical property of a user; and providing the data file to the user if the source geographical property matches the user geographical property. In one embodiment, the computer is a server computer connected to the Internet.

By matching the geographical property associated with a data file with the geographical property of the user, regional content that is geographically relevant for the user may be provided. Regionalizing user and data file information helps the user find needed information faster and more precisely.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The method and the system for providing regional content is described in further detail using exemplary embodiments accompanying figures.

In this disclosure, regional content refers to contents related to a certain geographical region or a local area. Geographical information refers to information associated with geographical locations, and may be keyword-based or suffix-based. Geographical properties are identifiers of geographical locations.

In the presence disclosure, a "module" or a "unit" in general refers to a functionality designed to perform a particular task or function. A module or a unit can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, not structural, and the functions of several units may be performed by a single combined device or component. When used in a computer-based system, regular computer components such as a processor, a storage and memory may be programmed to function as one or more units or devices to perform the various respective functions.

Figure 1:
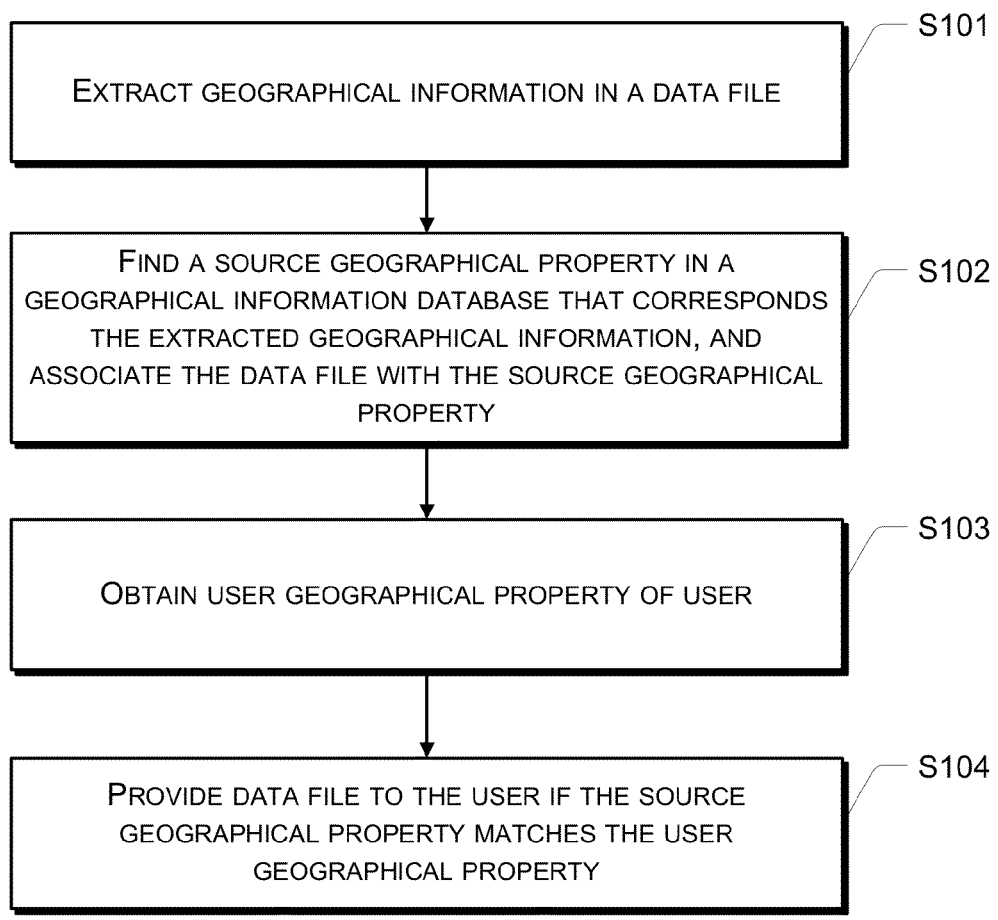
FIG. 1 shows a flow chart of an exemplary process for providing regional content in accordance with the present disclosure.

FIG. 1 shows a flow chart of an exemplary process 100 for providing regional content in accordance with the present disclosure. In this description, the order in which a process is described is not intended to be construed as a limitation, and any number of the described process blocks may be combined in any order to implement the method, or an alternate method. The process 100 shown in FIG. 1 is described as follows.

S101: A system for providing regional information extracts geographical information from data file. A data file may be any contents such as news, sports, entertainment, blog, forum, album, and video. A data file may be stored in form of a web page on the Internet. Many data files available on the Internet have geographical information contained therein. Examples of such geographical information are geographical names such as province, city, and district. Geographical information commonly exists in the form of text information, but may also exist in other forms such as image and sound.

Any suitable method for information extraction may be used to extract geographical information from data files on the Internet. Two exemplary methods for extracting geographical information are described below.

Figure 2:
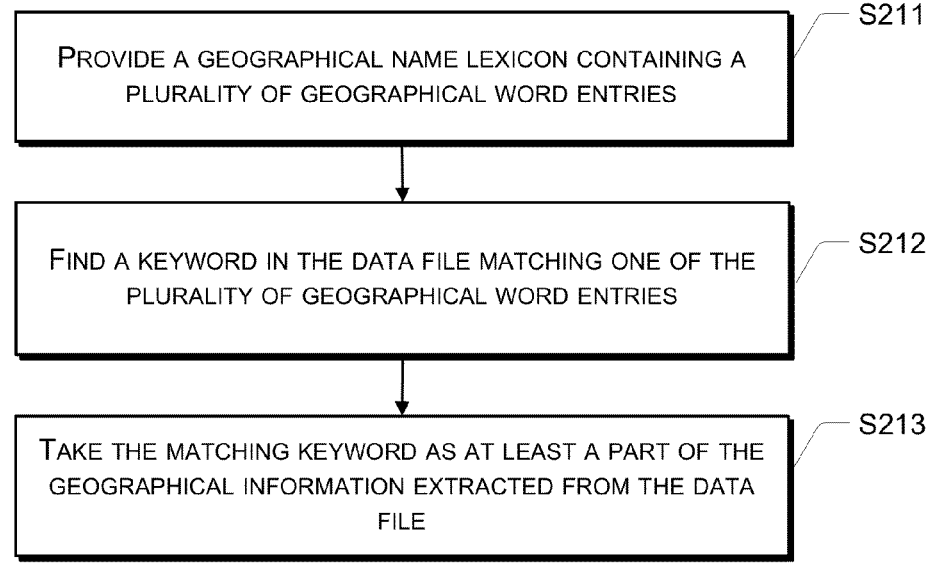
FIG. 2 shows a flow chart of a first exemplary process for extracting geographical information from a data file.

FIG. 2 shows a flow chart of a first exemplary process 200 for extracting geographical information from a data file. The first exemplary process 200 uses geographical name lexicon, which may be built in advance and provided for the system to use for the purpose of geographical information extraction (block S211 of FIG. 2). The geographical name lexicon stores geographical names, such as names of countries or nations, names of provinces (or equivalent government level municipalities such as autonomous regions, and special administrative regions), names of counties (or equivalent government level municipalities such as county-level cities and county-level regions), names of districts (or equivalent regions such as special districts), names of towns, villages, subdistricts, names of communities, and names of streets, and roads.

The geographical name lexicon may further include names, words, and phrases that are indicative of geographical names. For example, where enough nexus exists, names of colleges and universities, points of interest (POI), companies, specialties, local products, communities, scenes, and any other landmarks, may be indicative of the geographical names of their corresponding locations or represent the location, and thus also be used as geographical information. For instance, Tsinghua University may represent the geographical information of its location, namely Wudaokou, Haidian District, Beijing. Mao' Restaurant (Lanbao Branch) may represent the geographical information of its location, namely Lanbao International Center, West Dawanglu, Beijing. The company TaoBao.com may represent the geographical information of its location, namely No. 391, Wenerlu Rd., Hangzhou City, Zhejiang. Xihu Longjing tea may represent the geographical information of its the place where it is made, namely Xihu District, Hangzhou City, Zhejing. Summer Palace may represent the geographical information of its location, namely Haidian District, Beijing. Neighborhood community Sunshine 100 may represent the geographical information of its location, namely West Dawanglu, Chaoyang District, Beijing.

The system extracts geographical information from a data file using the above geographical name lexicon as a reference. For example, the system may finds a keyword in the data file that matches a geographical name listed in the geographical name lexicon (S212), and extract the matching keyword from the data file. This can be done using any keyword-based search techniques. The extracted keyword may constitute at least a part of the geographical information that is extracted from the data file (S213).

Figure 3:
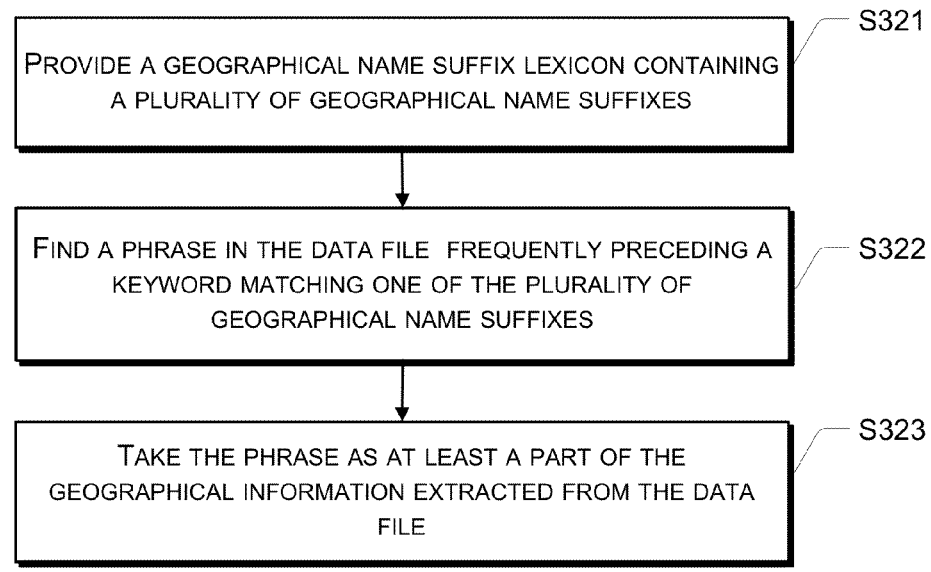
FIG. 3 shows a flow chart of a second exemplary process for extracting geographical information from a data file.

FIG. 3 shows a flow chart of a second exemplary process 300 for extracting geographical information from a data file. The second exemplary process 300 for extracting geographical information from a data file uses a geographical name suffix lexicon. The geographical name suffix lexicon stores geographical name suffixes and can be built in advance and provided for the purpose of extracting geographical information (S321). For example, the geographical name suffix lexicon may include common geographical name suffixes such as "province", "city", "county", "village", "district", "road", and "street" which usually appear at the end of geographical names. It is noted that in some languages, these names may appear as prefix in front of geographical names.

The system searches the data file to find a keyword matching a geographical name suffix listed in the lexicon, identifies a phrase that frequently proceeds the keyword, and extracts the phrase from the data file (S322). The extracted phrase is then taken as at least a part of the geographical information extracted from the data file (S323).

For example, suppose the suffix "city" in the geographical name suffix lexicon is found in the data file, and the phrase "Beijing" is found to frequently appear immediately prior to the suffix "city". The system may take "Beijing" as the geographical information of the data file.

It is noted that in addition to the above two exemplary methods of extracting geographical information from a data file, any other suitable methods may be used to extract geographical information from a data file.

Multiple pieces of geographical information may exist in the same data file. In this case, the multiple pieces of geographical information may be identified from the data file using a suitable method described above. The multiple pieces of geographical information may be combined as the geographical information extracted from the data file, or each piece of geographical information may be used separately as the geographical information extracted from the data file. However, in some embodiments it may be desirable to choose among the multiple pieces of geographical information extracted from the data file. This may be the case specially when the multiple pieces of geographical information relate to different geographical locations, because normally a data file having descriptive contents should have geographical information that centers around just one primary geographical location. For example, in a news reporting Sichuan earthquake, "Sichuan" is extracted as geographical information. However, the news may also report donations from other provinces and cities to Sichuan. As a result, other geographical information such as "Guangdong" and "Beijing" may also be extracted. In this case, it may be appropriate to treat "Sichuan" as the primary geographical information among the extracted geographical information because that is where the center of the story is.

The following describes an exemplary method of determining primary geographical information from multiple pieces of extracted geographical information.

In one embodiment, to extract the geographical information from the data file, the system identifies multiple geographical information pieces from the data file, and takes the geographical information piece which has the highest frequency of appearance in the data file to be the primary geographical information extracted from the data file.

The above may be illustrated using the above example of a news report on Sichuan earthquake. Suppose the geographical name "Sichuan" appeared six times in a news report (a data file), while "Beijing" appears two times, and "Guangdong" appears one time. Therefore, "Sichuan" has the highest frequency of appearance, and is determined to be the primary geographical information of the data file. In actual applications, "Sichuan" maybe determined to be ultimate geographical information of the data file to render the geographically relevant news content to pursuant users.

However, another news report of the same event may report more about cities, counties and autonomous districts, etc, within the territory of Sichuan, where the disaster happened. Donations from other provinces and cities such as Beijing and Guangdong to disaster areas may also be reported. As a result, the frequency of appearance of "Sichuan" may be the same as or even below the frequencies of other geographical names such as "Beijing" and "Guangdong" in the data file of the user boat. But because Sichuan is clearly the center of the report, it should be selected as primary geographical information from the data file. The method of making such a proper selection is therefore needed.

In one embodiment, a geographical information database containing multiple geographical information pieces and affiliating relationships among the geographical information pieces is used. The frequency of the appearance of each geographical information piece takes into account the appearances of at least some of the affiliated geographical information pieces having an affiliating relationship with the geographical information piece.

Figure 4:
FIG. 4 shows a structural diagram of a geographical information database.

For example, each geographical information piece may be a geographical name or a phrase indicative of a geographical name. The frequency of appearance of each geographical information piece representing a geographical area takes into account the appearances of the geographical names of geographical sub-areas or places which fall within the geographical area. Alternatively or additionally, the frequency of appearance may take into account the appearances of subordinate geographical names affiliated with the said geographical name. The affiliated relationship between the subordinate geographical names and the said geographical name may be defined by a physical relationship therebetween including any one or more of territorial relationship, jurisdiction relationship, administrative relationship, municipal relationship, and political relationship. An exemplary geographical information database is shown in FIG. 4, which will be discussed further below.

For example, suppose in the data file, "Sichuan" appears once, "Wenchuan" appears once, "Mianzhu" appears once, "Beichuan" appears once, "Beijing" appears once, and "Guangdong" appears once. As Wenchuan, Mainzhu, Beichuan are municipal areas in Sichuan province, the three appearances of these three areas counted as the appearances of "Sichuan". Together with the single appearance of "Sichuan" itself, "Sichuan" is deemed to have four appearances, while "Beijing" and "Guangdong" each has one appearance. As a result, "Sichuan" effectively has the highest frequency of appearance, and is thus taken as the primary geographical information extracted from the data file. "Sichuan" may also be taking as the ultimate geographical information of the data file for the rendering geographically relevant information to users.

The affiliated relationships of the geographical names may be determined using the geographical information database. In addition to the geographical names contained in the geographical name lexicon as described above, the geographical information database may also store affiliated relationships among all geographical information. For example, the geographical information database may include a geographical name at the province-level (e.g., Sichuan), multiple city-level geographical names that are under the province-level, multiple county-level geographical names that are under each city, multiple district-level geographical names that are under each county, and so forth. Other geographical names at the provincial level and its affiliated lower levels would have similar relationship patterns. The geographical information database may further include other levels such as country-level geographical information with state-level or province-level geographical information included under each country.

It should be noted that the geographical name lexicon as described above may use the information contained in this geographical information database. Alternatively, the geographical name lexicon may be a part of the geographical information database.

Returning to FIG. 1, the remaining steps of the exemplary process 100 for providing the regional information is further described below.

S102: The system finds a source geographical property in the geographical information database that corresponds to the extracted geographical information, and associates the data file with the source geographical property. In a sense, the data file is labeled with the corresponding geographical property.

Here, the geographical information database may be the same as the geographical information database in block S101. The geographical information database stores geographical names. These geographical names may be organized into administrative divisions and subdivisions at the various levels, as shown in FIG. 4. Examples are geographical names at country-level, province-level, county-level; city-level, town-level, and village-level, with each level subordinate to the previous level. At each level, multiple types of geographical names may be included. The database defines affiliated relationships of these administrative divisions and their corresponding geographical names.

In particular, the geographical database may further include names, terms and phrases indicative of geographical names. Examples of such indicative names, terms and phrases include names of colleges and universities, names of points of interest, names of companies, names of specialties, names of products, names of communities, and names of scenic spots, etc. These names, terms and phrases indicative of geographical names may also have affiliated relationships among geographical information in the geographical information database.

Upon extracting the geographical information from the data file (block S101), the system identifies a corresponding geographical property in the geographical information database. A geographical property is an identifier of a certain geographic location. The system then associates the data file with the identified geographical property. In a sense, the data file is labeled with the identified geographical property. The geographical property that is associated with a data file may be referred to as a source geographical property.

For example, "Dawanglu Rd." is extracted as the geographical information from the data file. Using the geographical information database, the system may find a geographical property "Beijing—Chaoyang District—Dawanglu Rd." to be corresponding to the extracted geographical information "Dawanglu Rd.", and associates the data file with this geographical property.

S103: The system obtains a user's geographical property. The user may be any user who needs to access Internet content provided by the system. To provide geographically relevant content to the user, the system may use the method disclosed herein to select geographically relevant content from many candidate contents. To do this, the system first obtains the user's geographical property. Because each data file has been associated (labeled) with a source geographical property, the system may determine whether a data file is geographically relevant to the user by matching the user geographical property and the source geographical property.

It is reasonably assume that a user usually has some kind of a recognizable geographical property. The user geographical property is information related to a geographical location which is relevant to the user. Such geographical location relevance may be due to the user's permanent or temporary physical location or residents, or due to a certain historical or social connection between the geographical location and the user.

An example of a user geographical property is a geographical location where the user accesses a client to connect to the Internet. This geographical location may be revealed by an IP (Internet Protocol) address of the user client that connects to the Internet. For example, suppose the present user has an IP address 202.115.33.3. Using an IP address finder, this particular IP address may be found to come from "Engineering Design Center of Sichuan University", whose address is "Sichuan Province—Chengdu City—Engineering Design of Sichuan University". This address may be used as the user's geographical property. As illustrated in this example, therefore, the system obtains the user's geographical property by inquiring IP address of the client used by the user.

Alternatively, a user's geographical property may be a registered address of the user, e.g., a registered home address, a school address, or a work address. A user's geographical property thus may be obtained by inquiring the user's registered address.

Alternatively, a user's geographical property may be a geographical location set by the user. For example, a user may set "Xiamen City" as his or her geographical location. As a result, a geographical property may be obtained by inquiring the geographical location set by the user.

Alternatively, a user's geographical property may be obtained by generating the coordinate information of the user. For example, a user may determine his present coordinate information using a portable GPS. The system obtains the user's present geographical location by obtaining this coordinate information.

Furthermore, a user's geographical property may alternatively be obtained by collecting a focus point the user's web browsing. For example, if a user recently searched or inquired "Jiu Zhaigou", a scenic geographical location, it is likely that the user may want to travel to that place in the near future. As a result, the system may determine that "Jiu Zhaigou" is a geographical property relevant to the user. This user's geographical property may thus be obtained by collecting the geographical locations that have been searched or inquired by the user within that period of time.

The above are just a number of exemplary methods for obtaining a user's geographical property. A skilled person in the art should be able to appreciate that the present disclosure is not construed to be limited to the few exemplary methods described above. As long as a user's geographical property can be obtained, regardless of its type and the manner of obtaining, it can be used for the purpose of the present disclosure.

S104: The system provides the data file to the user if the source geographical property of the data file matches the user geographical property. At this block, the source geographical property associated with the data file is first compared with the user's geographical property to find a match. If a match is found, the corresponding data file is provided to the user.

It is noted that there may be a large number of data files involved in the content providing process described herein. For example, all data files fetched by a search engine using a web crawler on the Internet on the present day or within a last few days may be available for the system to choose from. With the services provided by existing websites, it is completely feasible to collect and process all these data files over the Internet.

It is noted that a match between a source geographical property and the user geographical property does not need to be an exact match in the literal sense. A match can be found on various degrees of relevance. If the source geographical property is deemed to be sufficiently relevant to the user geographical property, a match may be found.

As illustrated above, geographical properties that are associated with data files may include geographical names at different levels of administrative divisions. For example, a complete geographical property associated with certain data file may be "Beijing City—Chaoyang District—Dawanglu Rd.". A complete geographical property associated with another data file may be "Beijing City—Chaoyang District—Jianguomen Rd.". A complete geographical property associated with still another data file may be "Beijing City—Chaoyang District". If a user's geographical location is Dawanglu Rd., the data file associated with "Beijing City—Chaoyang District—Dawanglu Rd.", rather than the data file associated with "Beijing City—Chaoyang District—Jianguomen Rd.", may be provided to the user. But the data file associated with "Beijing City—Chaoyang District" may also be provided to the user. Here, the data file associated with "Beijing City—Chaoyang District" may include both the data file associated with "Beijing City—Chaoyang District—Dawanglu Rd." and the data file associated with "Beijing City—Chaoyang District—Jianguomen Rd.", and of course may further include other data files having a label under "Beijing City—Chaoyang District".

The above data files of various geographical levels may be provided to the user on level-by-level basis. Specifically, the system may provide a progressive regional navigation to the user, either automatically or allow the user to make selections by browsing. For example, the user may be allowed to select a certain level of administrative division of the geographical names. The selected level may be at the city level, e.g., Beijing City, or a lower district level, e.g., Chaoyang District.

It is appreciated that providing a data file to a user includes sending a link to a web page which contains the data file (or has access thereto) to a web browser of a user client.

It should be noted that S101, S102, and S103 in FIG. 1 do not have to be in that particular order. For example, S103 may be executed first, while S101 and S102 are executed subsequently, so long as certain results have been obtained using blocks S102 and S103 prior to S104.

FIG. 4 shows a structural diagram of a geographical information database 400. Geographical names, and affiliated relationships of administrative divisions in the above geographical information database may be organized as in FIG. 4.

Using the above-illustrated exemplary method, regional content that is geographically relevant to the user may be provided. Moreover, data files are regionalized to help a user find needed information more quickly and more precisely.

The disclosed method has a wide range of applications. Exemplary applications may be found in the following situations:

1) News Search

Using method disclosed herein, news may be categorized automatically according to regions to generate aggregates of local news. The aggregated regional news contents are then automatically recommended to a user based on the visiting user's geographical property. Moreover, by annotating the news with complete regional information, progressive regional navigation may be made possible for user browsing.

2) Providing Daily Life Information

Daily life services are among popular Internet services in many countries. Compared with other information, daily life service information puts more emphasis on localization, accuracy and timeliness. Using the method disclosed herein, the daily life service information may be effectively aggregated according to various regions. With the information regionalized, local daily life service information may be automatically sent to a user whose geographical property is recognized. This improves effectiveness and efficiency of the daily life service information. For example, daily life service information such as dining information, discount information, rental information, and part-time job information in a certain region may be pertinently provided to a user related to that region. The method results in better understanding of the daily life service information of a region by users.

3) Community and Society Network Service (SNS)

Current community services include forums, blogs, albums, and groups. Most of these existing services aggregate information according to topics and provide the information to all users without geographical differentiation. A user searches data mostly using a keyword. With the disclosed method, however, the data can be aggregated according to different places and different regions. Similarly, community guides and recommendations can be effectively conducted based on a user's geographical information to allow the user to conveniently learn what nearby Internet users care about, and allow a circle of friends to be formed according to the location. This improves online social networking and interaction.

In general, by regionalizing Internet information and recognizing a geographical property of a user, large amount of Internet data can be effectively provided to the user based on the user's geographical property with improved efficiency and effectiveness. The disclosed method thus has a wide range of prospective applications in Internet services.

Figure 5:
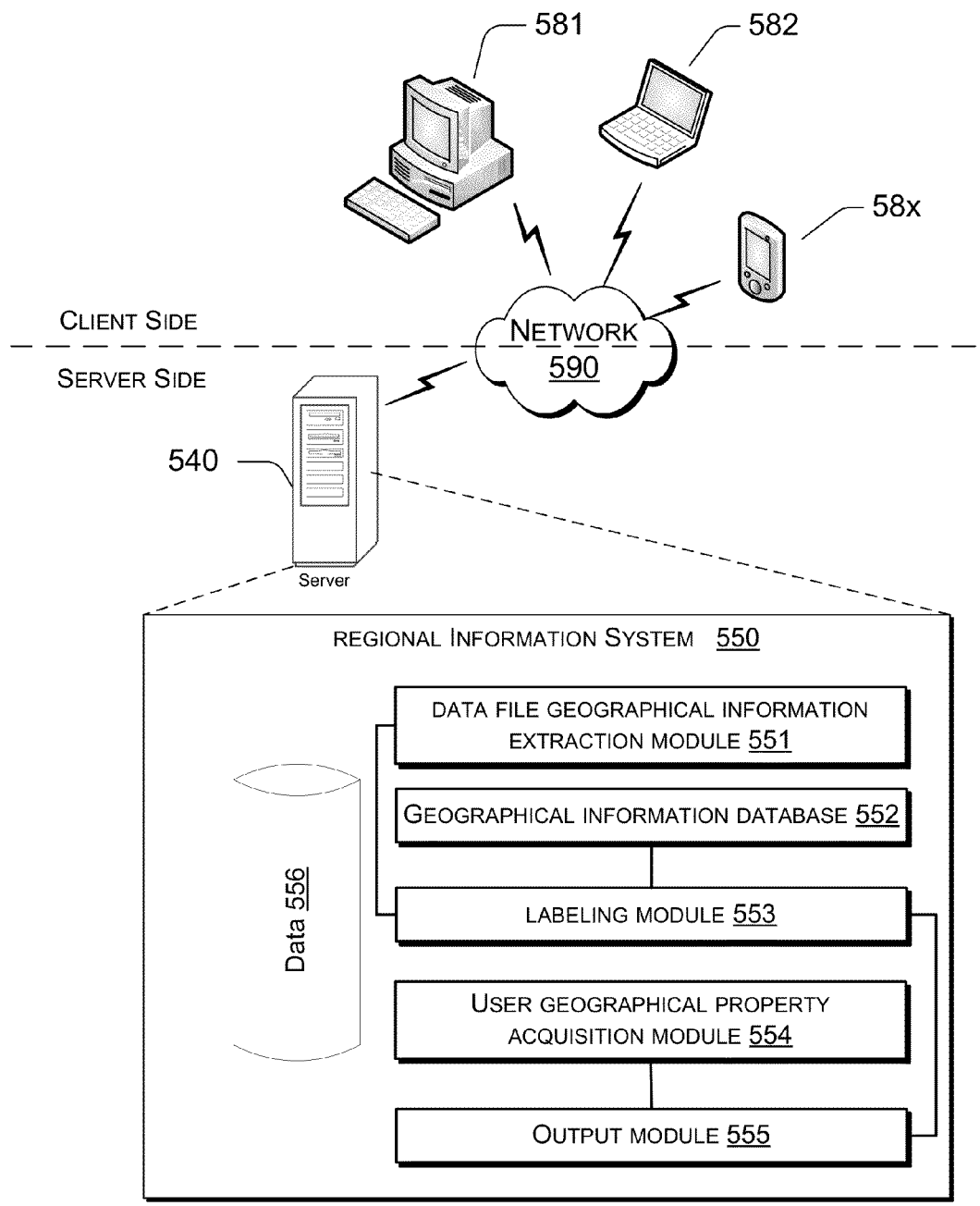
FIG. 5 shows a schematic structural diagram of an exemplary regional information system in an exemplary environment.

FIG. 5 shows a schematic structural diagram of an exemplary regional information system in an exemplary environment 500. Regional information system 550 is placed in exemplary environment 500 for implementing the method of the present disclosure. As illustrated in environment 500, some components reside on a client side and other components reside on a server side. However, these components may reside in multiple other locations. Furthermore, two or more of the illustrated components may combine to form a single component at a single location.

The regional information system 550 is implemented in a computer system 540 which is connected to client-side computing devices (client terminals) such as 581, 582 and 583 through network(s) 590, such that users (not shown) may access the regional information system 550 through the client-side computing devices. In one embodiment, computing system 540 is a server, while client-side computing devices 581, 582 and 583 may each be a computer or a portable device, used as a user terminal. The server 540 may include common computer components such as processor(s), I/O devices, computer readable media, and network interface (not shown).

The computer readable media stores application program modules and data 556 (such as data files and geographical information). Application program modules contain instructions which, when executed by processor(s), cause the processor(s) to perform actions of a process described herein. For example, the computer processor of server 540 may be programmed to extract geographical information from a data file; associate the data file with a source geographical property corresponding to the extracted geographical information according to a geographical information database; obtain a user geographical property of a user; and provide the data file to the user if the source geographical property matches the user geographical property.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing system or device may be any device that has a processor, an I/O device and a memory (either an internal memory or an external memory), and is not limited to a personal computer. Especially, computer system 540 may be a server computer, or a cluster of such server computers, connected through network(s) 590, which may either be the Internet or an intranet. Especially, the computer device 540 may be a web server, or a cluster of such servers hosting a website such as an e-commerce site.

In one embodiment, regional information system 550 is configured to have various functional modules to perform the functions described herein. A data file geographical information extraction module 551 is used for extracting geographical information from a data file. A geographical information database 552 is used for storing geographical names, terms and phrases indicative of geographical names, and affiliated relationships among geographical names. A labeling module 553 is used for identifying a source geographical property corresponding to the extracted geographical information based on the geographical information database, and labeling (associating) the data file with the identified source geographical property. A user geographical property acquisition module 554 is used for obtaining a geographical property of a user. An output module 555 is used for providing to the user the data file labeled with the source geographical property matching the user geographical property.

The geographical information database 552 may be stored in data storage 556. In addition, a geographical name lexicon containing geographical names, and terms and phrases indicative of geographical names may also be stored in data storage 556. The use of such a geographical name lexicon has been described herein with reference to FIGS. 1-3.

It is noted that the geographical name lexicon may be contained in the data file geographical information extraction module 551, or contained in the geographical information database 552. Alternatively, the geographical name lexicon may also be separate from the data file geographical information extraction module 551 or the geographical information database 552.

The regional information system 510 may further include a geographical name suffix lexicon, whose function has been described with reference to FIGS. 1-3. The geographical name suffix lexicon may be stored in data storage 556. The geographical name suffix lexicon may be contained in the data file geographical information extraction module 551, or contained in the geographical information database 552. The geographical name suffix lexicon may also be separate from the data file geographical information extraction module 551 or the geographical information database 552.

The regional information system 550 may be further adapted to determine a primary geographical information piece among multiple pieces of geographical information extracted from a data file, as described herein. The regional information system 550 may also be adapted to compute frequencies of appearance of a piece of geographical information as described herein with reference to FIGS. 1-4.

Preferably, the user geographical property acquisition module 552 in the regional information system 550 obtains a user's geographical property by any one or more of the methods described herein, including inquiring an IP address of a user client, inquiring an address registered by the user, inquiring a geographical location set by a user, obtaining coordinate information of the user, or collecting a focus point of the user's online browsing.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for providing regional content, the method comprising:
    identifying a plurality of geographical information pieces in a data file, wherein each geographical information piece corresponds to an identifier of a geographical region; wherein the identifying of the plurality of geographical information pieces in the data file comprises the following:
        A) providing a geographical name lexicon containing a plurality of geographical word entries, the plurality of geographical word entries include phrases indicative of geographical names, names of establishments indicative of geographical names, names of products or services indicative of geographical names, or any combination thereof;
        finding a first keyword and a second keyword in the data file matching one of the plurality of geographical word entries; and
        taking the matching keywords as at least a part of the geographical information pieces extracted from the data file; and
        B) providing a geographical name affix lexicon containing a plurality of geographical name suffixes and prefixes, the plurality of geographical name suffixes and prefixes including common terms used to identify a geographical location;
        finding a phrase in the data file frequently preceding a keyword matching one of the plurality of geographical name affixes; and
        taking the phrase as at least a part of the pieces of geographical information extracted from the data file;
    calculating a frequency of appearance in the data file for each geographical information piece that corresponds to an identifier of a geographical re ion that has an affiliated relationship with one or more subordinate geographical regions based at least in part on summing the respective frequency of appearance for each geographical information piece that corresponds to one of the subordinate geographical regions;
    associating the data file with a source geographical property corresponding to geographical information extracted from the data file based at least in part on the calculated frequency of appearances of the geographical information pieces;
    obtaining a user geographical property of a user; and
    providing the data file to a computing device of the user responsive to the source geographical property matching the user geographical property.

2. The method as recited in claim 1, wherein the plurality of geographical word entries include geographical names and the phases indicative of geographical names.

3. The method as recited in claim 1, wherein each geographical information piece comprises a geographical name or a phrase indicative of a geographical name.

4. The method as recited in claim 1, wherein the affiliated relationship between the subordinate geographical names and the geographical name is defined by a physical relationship therebetween including any one or more of territorial relationship, jurisdiction relationship, administrative relationship, municipal relationship, and political relationship.

5. The method as recited in claim 1, wherein the obtaining a user geographical property comprises any one or more of the following:
    obtaining the user geographical property by inquiring the user's IP address;
    obtaining the user geographical property by inquiring the user's registered address;
    obtaining the user geographical property by inquiring a geographical location set by the user;
    obtaining the user geographical property by obtaining coordinate information of the user; and
    obtaining the user geographical property by collecting a focus point of the user's online browsing.

6. The method as recited in claim 1, wherein the providing the data file to a computing device of the user responsive to the source geographical property matching the user geographical property comprises:

identifying a plurality of data files whose source geographical property matches the user geographical property at one of various geographical levels; and allowing the user to select from the plurality of data files at the various geographical levels.

7. The method as recited in claim 6, wherein the various geographical levels are defined by a physical relationship including any one of territorial relationship, jurisdiction relationship, administrative relationship, municipal relationship, and political relationship.

8. The method as recited in claim 1, wherein the obtaining a user geographical property comprises:

obtaining the user geographical property by inquiring the user's registered address, the registered address including a home address, a school address, or a work address.

9. A computer-implemented system of providing regional content, wherein the system comprises a computer having a computer processor and a storage, the computer processor being programmed to perform the following:

identifying a plurality of geographical information pieces in a data file, wherein each geographical information piece corresponds to an identifier of a geographical region; wherein the identifying of the plurality of geographical information pieces in the data file comprises the following:

A) providing a geographical name lexicon containing a plurality of geographical word entries, the plurality of geographical word entries include phrases indicative of geographical names, names of establishments indicative of geographical names, names of products or services indicative of geographical names, or any combination thereof;

finding a first keyword and a second keyword in the data file matching one of the plurality of geographical word entries; and taking the matching keywords as at least a part of the geographical information pieces extracted from the data file; and B) providing a geographical name affix lexicon containing a plurality of geographical name suffixes and prefixes, the plurality of geographical name suffixes and prefixes including common terms used to identify a geographical location;

finding a phrase in the data file frequently preceding a keyword matching one of the plurality of geographical name affixes; and taking the phrase as at least a part of the pieces of geographical information extracted from the data file;

calculating a frequency of appearance in the data file for each geographical information piece that corresponds to an identifier of a geographical region that has an affiliated relationship with one or more subordinate geographical regions based at least in part on summing the respective frequency of appearance for each geographical information piece that corresponds to one of the subordinate geographical regions;

associating the data file with a source geographical property corresponding to geographical information extracted from the data file based at least in part on the calculated frequency of appearances of the geographical information pieces;

obtaining a user geographical property of a user; and providing the data file to a computing device of the user responsive to the source geographical property matching the user geographical property.

10. The system as recited in claim 9, wherein the computer is a server computer connected to the Internet.

11. The system as recited in claim 9, wherein the geographical information database is stored in the storage of the system.

12. A computer program product for providing regional content, the computer program product being embodied in a tangible non-transitory computer readable storage medium and comprising computer instructions for:

identifying a plurality of geographical information pieces in a data file, wherein each geographical information piece corresponds to an identifier of a geographical region; wherein the identifying of the plurality of geographical information pieces in the data file comprises the following:

A) providing a geographical name lexicon containing a plurality of geographical word entries, the plurality of geographical word entries include phrases indicative of geographical names, the phrases indicative of geographical names including phrases indicative of geographical names, names of establishments indicative of geographical names, names of products or services indicative of geographical names, or any combination thereof;

finding a first keyword and a second keyword in the data file matching one of the plurality of geographical word entries; and taking the matching keywords as at least a part of the geographical information pieces extracted from the data file; and B) providing a geographical name affix lexicon containing a plurality of geographical name suffixes and prefixes, the plurality of geographical name suffixes and prefixes including common terms used to identify a geographical location;

finding a phrase in the data file frequently preceding a keyword matching one of the plurality of geographical name affixes; and taking the phrase as at least a part of the pieces of geographical information extracted from the data file;

determining an initial frequency of appearance in the data file for each geographical information piece of the plurality of geographical information pieces;

calculating a frequency of appearance in the data file for each geographical information piece that corresponds to an identifier of a geographical region that has an affiliated relationship with one or more subordinate geographical regions based at least in part on summing the respective frequency of appearance for each geographical information piece that corresponds to one of the subordinate geographical regions;

associating the data file with a source geographical property corresponding to geographical information extracted from the data file based at least in part on the calculated frequency of appearances of the geographical information pieces;

obtaining a user geographical property of a user; and providing the data file to a computing device of the user responsive to the source geographical property matching the user geographical property.

13. The computer program product as recited in claim 12, wherein identifying a plurality of geographical information pieces in a data file comprises:

providing a geographical-name-affix lexicon containing a plurality of affixes for geographical names, wherein each affix is either a prefix or a suffix;

finding in the data file a phrase that includes a keyword matching one of the plurality of affixes; and extracting from the data file geographical information corresponding to at least a portion of the phrase.

14. The computer program product as recited in claim 12, further comprising:
taking the geographical information piece which has a highest frequency of appearance in the data file to be the geographical information extracted from the data file.

15. The computer program product as recited in claim 12, wherein the providing the data file to a computing device of the user responsive to the source geographical property matching the user geographical property comprises:
identifying a plurality of data files whose source geographical property matches the user geographical property at one of various geographical levels; and
allowing the user to select from the plurality of data files at the various geographical levels.

16. The computer program product as recited in claim 15, wherein the various geographical levels are defined by a physical relationship including any one of territorial relationship, jurisdiction relationship, administrative relationship, municipal relationship, and political relationship.

* * * * *

UNITED STATES PATENT AND TRADEMARK OFFICE
CERTIFICATE OF CORRECTION

PATENT NO. : 8,812,536 B2
APPLICATION NO. : 12/664863
DATED : August 19, 2014
INVENTOR(S) : Lei et al.

It is certified that error appears in the above-identified patent and that said Letters Patent is hereby corrected as shown below:

In the Claims

In column 12, Line 24 in Claim 1, delete "re ion" and insert --region--, therefor.

Signed and Sealed this
Fifth Day of July, 2016

Michelle K. Lee
*Director of the United States Patent and Trademark Office*